(12) United States Patent
Jang et al.

(10) Patent No.: US 11,625,260 B2
(45) Date of Patent: Apr. 11, 2023

(54) METHOD FOR ENHANCING THROUGHPUT IN BLOCKCHAIN NETWORK

(71) Applicant: SOGANG UNIVERSITY RESEARCH & BUSINESS DEVELOPMENT FOUNDATION, Seoul (KR)

(72) Inventors: Ju Wook Jang, Seoul (KR); Beom Suk Lee, Seoul (KR); Jae Geun Song, Seoul (KR)

(73) Assignee: SOGANG UNIVERSITY RESEARCH & BUSINESS DEVELOPMENT FOUNDATION, Seoul (KR)

(*) Notice: Subject to any disclaimer, the term of this patent is extended or adjusted under 35 U.S.C. 154(b) by 273 days.

(21) Appl. No.: 17/112,182

(22) Filed: Dec. 4, 2020

(65) Prior Publication Data
US 2021/0200570 A1    Jul. 1, 2021

(30) Foreign Application Priority Data
Dec. 26, 2019  (KR) .................. 10-2019-0175304

(51) Int. Cl.
| | |
|---|---|
| *H04L 41/083* | (2022.01) |
| *H04L 41/0894* | (2022.01) |
| *H04L 43/0852* | (2022.01) |
| *G06F 9/455* | (2018.01) |
| *G06F 9/48* | (2006.01) |
| *G06F 9/50* | (2006.01) |

(Continued)

(52) U.S. Cl.
CPC ........ *G06F 9/45558* (2013.01); *G06F 9/4881* (2013.01); *G06F 9/5077* (2013.01); *H04L 41/083* (2013.01); *H04L 41/0894* (2022.05); *H04L 43/0852* (2013.01); *G06F 2009/4557* (2013.01); *G06F 2009/45562* (2013.01); *G06F 2009/45583* (2013.01)

(58) Field of Classification Search
None
See application file for complete search history.

(56) References Cited

U.S. PATENT DOCUMENTS

| | | | |
|---|---|---|---|
| 2019/0018888 A1* | 1/2019 | Madisetti | H04L 9/3236 |
| 2019/0305931 A1* | 10/2019 | Borst | H04L 9/3239 |
| 2020/0177373 A1* | 6/2020 | Komandur | H04L 9/3247 |

FOREIGN PATENT DOCUMENTS

| | | | | |
|---|---|---|---|---|
| CN | 111835533 A | * | 10/2020 | G06F 11/3419 |
| KR | 101727525 | | 4/2017 | |

(Continued)

OTHER PUBLICATIONS

Author: Thakkar et al. Title: Performance Benchmarking and Optimizing Hyperledger Fabric Blockchain Platform Publisher: IEEE, DOI 10.1109/MASCOTS.2018.00034 Year: 2018 (Year: 2018).*

(Continued)

*Primary Examiner* — John A Follansbee
*Assistant Examiner* — Kamal M Hossain
(74) *Attorney, Agent, or Firm* — Cantor Colburn LLP

(57) ABSTRACT

In a hyper ledger-based blockchain network system, in order to adjust latency and throughput required by a specific hyper ledger-based network, by using a block size, an endorsement policy, the number of channels, and the number of vCPUs allocation, the latency and the throughput desired by a user are maintained.

9 Claims, 4 Drawing Sheets

(51) Int. Cl.
    *H04L 9/00*     (2022.01)
    *H04L 9/32*     (2006.01)
    *G06F 9/46*     (2006.01)
    *G06F 11/30*     (2006.01)

(56) References Cited

FOREIGN PATENT DOCUMENTS

| | | |
|---|---|---|
| KR | 101975822 | 5/2019 |
| KR | 20190068799 | 6/2019 |
| KR | 101996802 | 7/2019 |

OTHER PUBLICATIONS

Korean Office Action—Korean Application No. 10-2019-0175304 dated Nov. 17, 2022, citing Thakkar et al. and KR 10-1727525.

\* cited by examiner

METHOD FOR ENHANCING THROUGHPUT IN BLOCKCHAIN NETWORK

TECHNICAL FIELD

The invention relates to a method for enhancing throughput of a blockchain network, and more particularly, a method for enhancing throughput of a blockchain network capable of maintaining preset latency and throughput of the network by adjusting a block size, the number of vCPUs, the number of channels, and an endorsement policy.

BACKGROUND ART

A blockchain network is a distributed storage of data by users participating in the network directly verifying the data and reaching a consensus to allow the users to directly make transaction without a central management agency.

In the blockchain, since it is difficult to forge and alter transactions, reliability of data can be guaranteed, and since all users have the same blockchain ledger, anyone can read the blockchain ledger, the transparency and integrity of the data can be ensured.

The blockchain networks are divided into public blockchain networks and private blockchain networks. In the public blockchain network, all data are opened, and anyone can be a node that participates in the network to verify data and generate blocks. At present, Bitcoin and Ethereum are made up of public blockchain networks.

On the other hand, the private blockchain networks were developed for companies and were also called private blockchain, closed type blockchain, permissioned type blockchain, business blockchain, or enterprise blockchain. The transactions and actions of other than permitted participants are not shared and cannot be tracked. And, in order to participate in the private blockchain network, only a participant authorized by one subject can participate in generating a block, and a representative example of a private blockchain is a hyper ledger fabric. In the hyper ledger fabric, only authorized participants can participate in the blockchain network and can construct an organization within the network and share different ledgers as a logical group (channel).

The latency in a hyper ledger includes a time that is taken for a client to wait for a response from an endorser, a time that is taken for the client to deliver information to an orderer and for the orderer to acknowledge the information, a time that is taken for a peer to check and verify the transaction, a time that is taken for the peer to check whether the endorsement policy is correct for all transactions in a block, a time that is taken for the peer to check version information of the peer own database and the transaction of the block, and a time that is taken for the peer to update a correct write-set for all transactions of the block to the database. In the hyper ledger, one transaction occurs, and the consensus processes until storing the transaction in the database are diverse, and there is latency for each consensus process. In the related art, a consensus method was selected to match the throughput and latency that are targeted by the system.

As representative consensus methods, PoW, PoS, and DPOS can be exemplified. In the PoW, a specific consensus time is allowed to be maintained by adjusting difficulty with a consensus method with a block generated by a node that first found a hashing value by allowing all miners to perform hashing with the own random number by using the hash value of a specific difficulty as a target. In the PoS, the right to vote is in proportion to the amount of coins held, and blocks are generated by the entire consensus. In the DPoS, specific delegates are elected, and the delegates cast votes, so that the consensus time is shortened compared with the PoS. Therefore, the latency is greatly decreased. However, due to the consensus process, the latency is decreased, and thus, there is a risk. As a typical risk, in the DPoS, the entire nodes (21 nodes in the case of EOS) do not cast votes, but only the delegates cast votes, which cause a problem to the reliability of block generation. If only 11 nodes among the 21 nodes reach a consensus differently, the entire block can be modified. Therefore, there is a risk of abolition of the blockchain.

SUMMARY

The invention is to provide a method for enhancing throughput of a blockchain network capable of maintaining target latency and a target throughput of the blockchain network by sequentially adjusting a block size, the number of vCPUs, the number of channels, and an endorsement policy.

A method for enhancing throughput of a blockchain network, executed by a processor of a node constituting the blockchain network, according to a first aspect of the present invention for achieving the above-described technical problem includes the steps of: (a) pre-designing and setting target latency in the blockchain network; (b) measuring latency for the blockchain network; (c) comparing the preset target latency with the measured latency; (d) adjusting one or more of a block size, a number of channels, and an endorsement policy according to the comparison result; It is characterized in that it decreases latency.

In the method according to the first aspect, it is preferable that the target latency is a latency required for a consensus process in the blockchain network, in the step (b), the latency is a time which is required to fill a block constituting one block size, and the block size is represented by the number of transactions which are stored in the block.

In the method according to the first aspect, it is preferable that the step (b) is measuring the latency for a process where one block of the blockchain network is filled with transactions and a consensus process is fulfilled, the step (c) is comparing the measured latency with the target latency for a process where one block is filled in accordance with one block size and a consensus process is fulfilled, and the step (d) is adjusting the block size according to the comparison result of step (c).

In the method according to the first aspect, it is preferable that the step (d) includes: increasing the block size if the target latency is larger than the measured latency; and decreasing the block size if the target latency is not larger than the measured latency.

In the method according to the first aspect, it is preferable that the block size, the number of channels, and the endorsement policy are sequentially adjusted.

In the method according to the first aspect, it is preferable that the step (d) includes: checking the number of vCPUs that can be allocated according to the measured latency; and changing the number of channels at the same rate as the checked number of the vCPUs.

In the method according to the first aspect, it is preferable that the step (d) includes: increasing the number of vCPUs and the number of channels if the number of vCPUs that can be allocated is larger than the number of vCPUs that are currently allocated; and adjusting the endorsement policy if the number of vCPUs that can be allocated is not larger than the number of vCPUs that are currently allocated.

In the method according to the first aspect, it is preferable that the latency is determined according to the number of transactions that occur.

According to a second aspect of the present invention, there is provided a blockchain network comprising a number of nodes which store and execute automatically a chain code, wherein the chain code configured to store a preset target latency, compare the target latency with a latency measured in real time, and adjust a block size so as to maintain the target latency according to a comparison result; and, wherein the target latency is a latency required for a consensus process in the blockchain network, and wherein the measured latency is a latency required to fill a block constituting one block size.

In the blockchain network according to the second aspect, it is preferable that the blockchain network is a hyper ledger blockchain network.

In the blockchain network according to the second aspect, it is preferable that the chain code is set so as to adjust the number of VCPUs and the number of channels in a case where the target latency cannot be maintained even after the block size is adjusted.

In the blockchain network according to the second aspect, it is preferable that the chain code is set so as to adjust an endorsement policy in a case where the target latency cannot be maintained even after the block size is adjusted.

In the blockchain network according to the invention the latency and throughput of the network required by the user can be maintained by sequentially adjusts the block size, the number of vCPUs, the number of channels, and the endorsement policy instead of adjusting a consensus method.

DETAILED DESCRIPTION

According to an aspect of the invention, in a hyper ledger-based blockchain network system, in order to adjust latency and throughput required by a specific hyper ledger-based network, by using a block size, an endorsement policy, the number of channels, vCPU allocation, and the like instead of a conventional method in the related art, the latency and the throughput desired by a user are maintained. The bock size is defined as the number of transactions filling one block. A system may be set so that, only after the block is filled, a block is newly generated. In this case, the latency may increase if the number of transactions is small even in a case where the block size is large. The channel can be considered as a blockchain network to which nodes are associated. The nodes participating in the same channel store the same database. If the nodes storing the same database operate the channel to transmit data, the throughput increases. The block size is represented by the number of transactions which are filled in the block.

The vCPU is an abbreviation for virtual CPU, and the vCPU is related to a concept of how much CPU performance will be allocated to the corresponding blockchain network in one computer. The target throughput and latency that the system is required to maintain is set, and appropriate feedback is made in consideration of the number of transactions occurring at this time.

Hereinafter, a hyper ledger-based blockchain network system according to a preferred embodiment and a method for enhancing throughput in the system will be described in detail with reference to the accompanying drawings. The method for enhancing throughput of the blockchain network according to the preferred embodiment, the latency and throughput required by a specific blockchain network in various systems can be maintained continuously by adjusting the block size, the number of vCPUs, the number of channels, and the endorsement policy. The method according to the invention is set with the chain code, stored in each node constituting the blockchain network to be automatically executed, and achieved through consensus.

Figure 1:
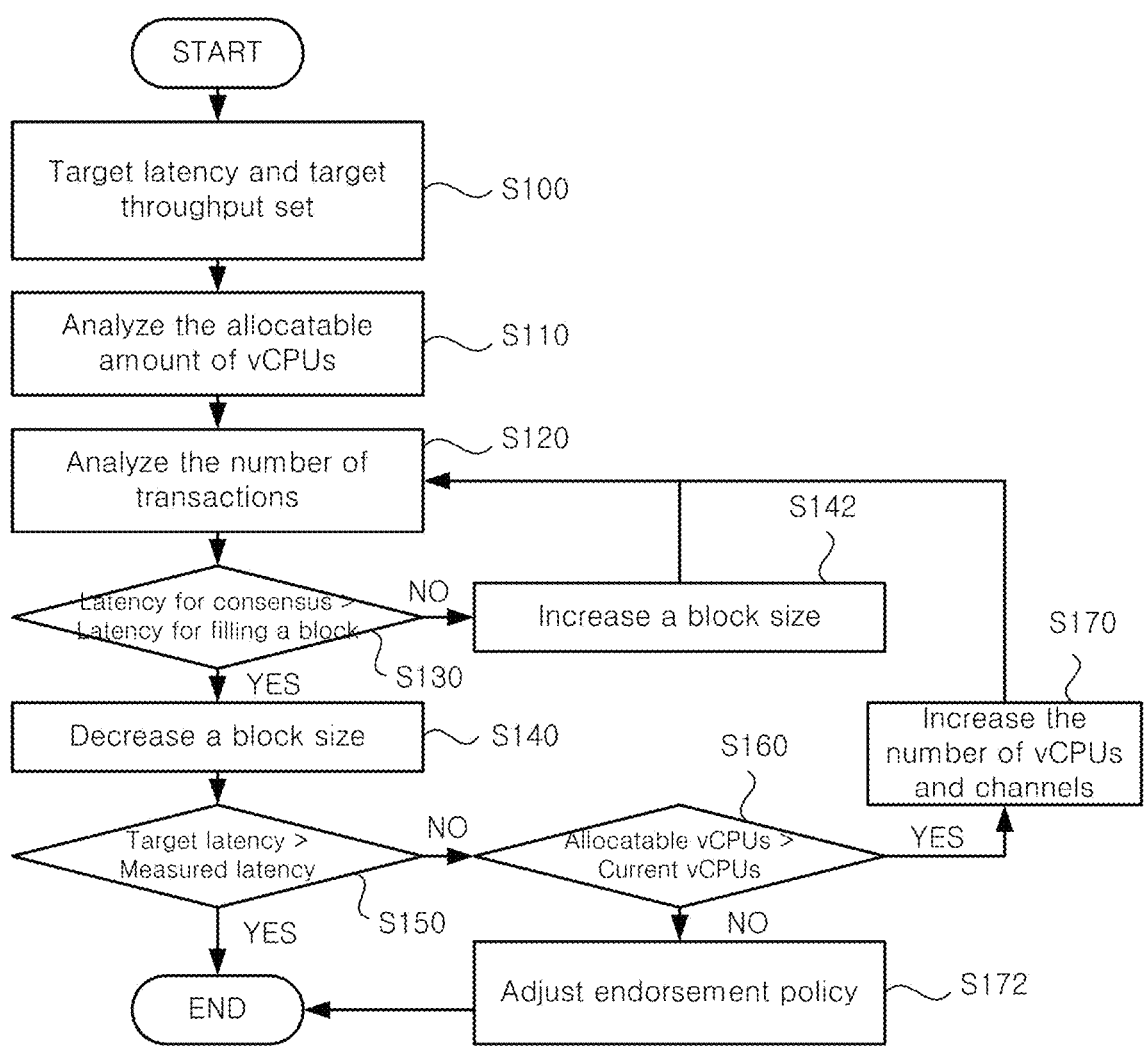
FIG. 1 is a flowchart illustrating a method for enhancing throughput of a blockchain network according to a preferred embodiment.

FIG. 1 is a flowchart illustrating the method for enhancing the throughput of the blockchain network according to the preferred embodiment. Referring to FIG. 1, first, in the method for enhancing the throughput of the blockchain network according to the invention, target latency and target throughput required for a specific blockchain network are set (step 100). Next, the number of transactions is input, and the allocatable amount of vCPU of the user is analyzed based on the input number of transactions (step 110), and the number of transactions that occurring is analyzed (step 120). The latency and throughput are measured by using a tool of so-called caliper of the hyper ledger, and the orderer that directly collects the transactions and generates the blocks measures an arrival rate and adjusts the latency based on the arrival ratio as compared with the total latency.

Figure 2:
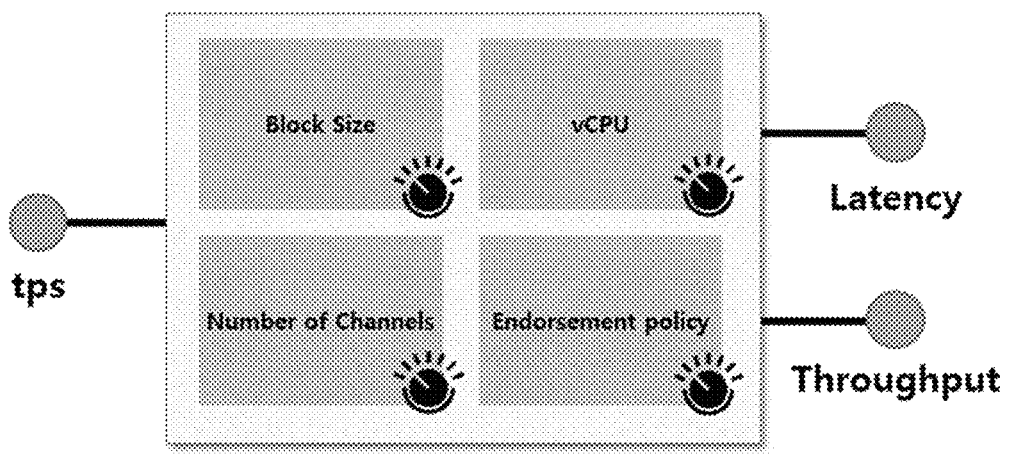
FIG. 2 is a schematic diagram illustrating the method for enhancing the throughput of the blockchain network according to the preferred embodiment.

FIG. 2 is a schematic diagram illustrating the method for enhancing the throughput of the blockchain network according to the preferred embodiment. Referring to FIG. 2, in the system according to the invention, in order to match the target latency and the target throughput, the block size, the number of vCPUs, the number of channels, and endorsement policy are sequentially adjusted according to the number of transactions incoming to a node in the network.

Figure 3:
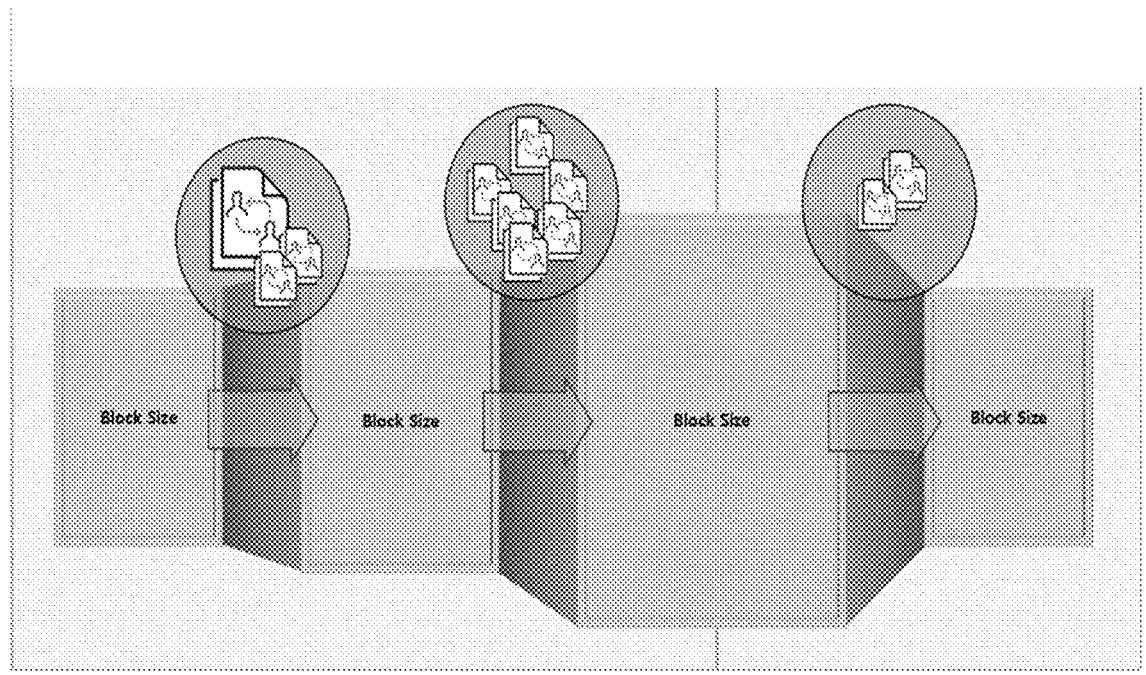
FIG. 3 is a schematic diagram illustrating the method for enhancing the throughput of the blockchain network according to the preferred embodiment, in which a block size is adjusted according to the number of transactions.

FIG. 3 is a schematic diagram illustrating adjusting the block size according to the number of transactions in the method for enhancing the throughput of the blockchain network according to the preferred embodiment. Referring to FIG. 3, in the case of Block Size, when a certain number of transactions occurs, the number of consensus processes in the case of the block size being large is smaller than the number of consensus processes in the case of the block size being small. Therefore, as the block size becomes larger, the throughput is increased, and the latency is decreased. However, in the case of the block size being large, depending on the system, if a small number of the transactions occur and then the speed of filling the block with the transactions is lower than the latency required for the consensus process, higher latency may be generated. Accordingly, the standard for adjusting the block size is determined by comparing (1) the latency that is taken until the number of transactions reaches the block size and the block is ready to be generated; and (2) the latency that is taken until the block is finally generated through the consensus process after that. If the target latency desired by the system is larger than the total latency (1+2), it is not necessary to adjust the block size. But if the number of transactions that arrive during the generation of the block through the consensus is smaller than the block size, it is required to wait additional transactions. Therefore, in this case, it becomes necessary to decrease the block size to allow the block to be quickly generated.

The latency required for the entire consensus process is compared with the latency required to fill one block with a preset block size (step 130). According to the comparison result, if the latency required for the entire consensus process is larger than the latency required to fill one block, the block size is allowed to be decreased (step 140). If the latency required for the entire consensus process is smaller than the latency required to fill one block, the block size is allowed to be increased (step 142). In other words, if the latency of the entire consensus process is smaller than the latency until the number of transactions to fill the block reaches the block size, the throughput can be increased by increasing the number of transactions that can be processed at one time by increasing the block size. On the contrary, if the latency of the entire consensus process is larger than the latency until the transaction to fill the block reaches the block size, the block size is allowed to be decreased, and thus the consensus process is performed in a state where the block is quickly filled.

Next, the target latency required by the network is compared with the currently measured latency for the network (step 150), and if the latency required by the network is larger than the currently measured latency of the network, the process is ended.

If the target latency required by the network is smaller than the currently measured latency, the number of vCPUs that can be allocated and the number of vCPUs that are currently allocated are compared (step 160). If the number of vCPUs that can be allocated is larger than the number of vCPUs that are currently allocated, the number of vCPUs and the number of channels are increased (step 170). That is, in a case where the measured latency of the current system is large, the number of vCPUs that can be allocated is checked, and after that, in a case where it is possible to increase the number more than the currently allocated number, the latency is decreased by increasing the number of vCPUs in proportion to the number of vCPUs and the number of channels, and the throughput is increased.

Figure 4:
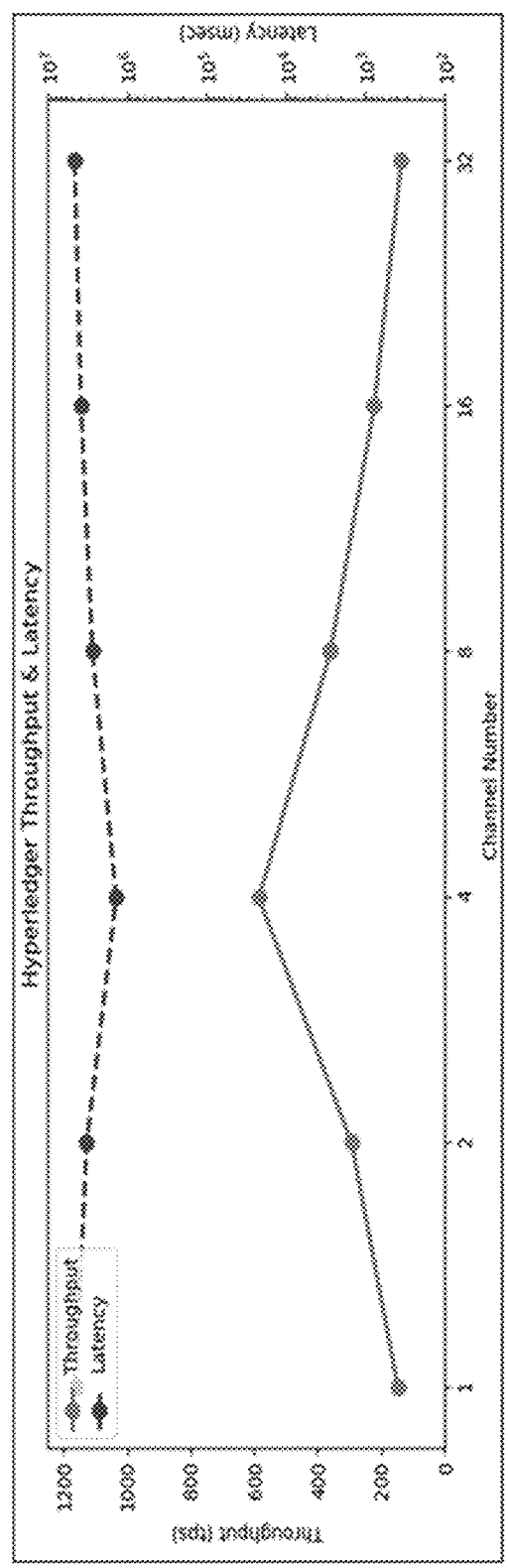
FIG. 4 is a graph illustrating changes in latency and throughput according to the number of channels in the method for enhancing the throughput of the blockchain network according to the preferred embodiment.
Figure 5:
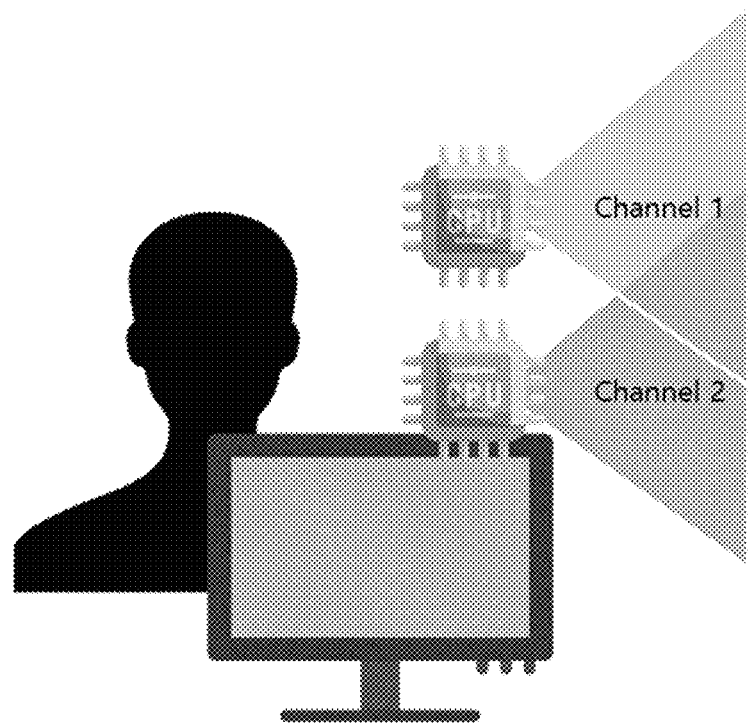
FIG. 5 is a schematic diagram illustrating a tendency according to adjusting the number of vCPUs and the number of channels in the method for enhancing the throughput of the blockchain network according to the preferred embodiment.

FIG. 4 is a graph illustrating changes in latency and throughput according to the number of channels in the method for enhancing the throughput of the blockchain network according to the preferred embodiment. FIG. 5 is a schematic diagram illustrating a tendency according to the number of vCPUs and the number of channels in the method for enhancing the throughput of the blockchain network according to the preferred embodiment.

FIG. 4 is a graph illustrating the adjustment of the latency and the throughput by proportionally adjusting the number of vCPUs and the number of channels in the system according to the invention, and the tendency. Referring to FIG. 4, it can be understood that the number of vCPUs and the number of channels a close relationship with each other. In order to operate one channel, in a case where insufficient vCPUs are allocated, almost all types of latency are increased. In a case where a sufficient number of vCPUs is allocated to participate in one channel, increasing the number of channels relative to the number of vCPUs or increasing the number of vCPUs relative to the number of channels does not significantly affect the latency and the throughput.

In order to meet the higher throughput or the lower latency required by the system, by increasing the number of channels and increasing the number of vCPUs with the same ratio, the above-mentioned problem can be solved.

If the number of vCPUs that can be allocated is not larger than the number of vCPUs that are currently allocated, the latency and the throughput are adjusted by adjusting the endorsement policy (step 172).

A block is generated through stepwise consensus processes between a plurality of peers. To generate a block, the endorsement policy is to decide how to select peers that first executes and authenticates a chain code and how to reach a consensus between the peers. For example, when there are a peer A, a peer B, and a peer C, a consensus policy can be set as "A and (B or C)" or "A or B or C". It can be seen that, as compared with the former case, the latter case is inferior in terms of accuracy or security, but the latter case is far superior in terms of latency. Ina case where the system does not meet the desired target latency, the endorsement policy is automatically changed according to the preset chain code.

As described above, in the method for enhancing the throughput of the blockchain network according to the invention, by comparing the latency and throughput required by the system with the latency currently measured in the system and adjusting the block size, the number of vCPUs, the number of channels, and the endorsement policy in order according to the comparison result, the entire latency is decreased, and the throughput is enhanced.

While the present invention has been particularly illustrated and described with reference to exemplary embodiments thereof, it should be understood by the skilled in the art that the invention is not limited to the disclosed embodiments, but various modifications and applications not illustrated in the above description can be made without departing from the spirit of the invention.// In addition, differences relating to the modifications and applications should be construed as being included within the scope of the invention as set forth in the appended claims.

In addition, differences relating to the modifications and applications should be construed as being included within the scope of the invention as set forth in the appended claims.

What is claimed is:

1. A method for enhancing throughput of a blockchain network, executed by a processor of a node constituting the blockchain network, the method comprising steps of:
   (a) designing and setting target latency in the blockchain network in advance;
   (b) measuring latency for the blockchain network;
   (c) comparing the target latency set in advance with the measured latency; and
   (d) adjusting a block size so as to maintain the target latency according to the comparison result, adjusting the number of vCPUs and the number of channels after determining that the target latency cannot be maintained even after the block size is adjusted, and adjusting an endorsement policy after determining that the target latency cannot be maintained even after the number of vCPUs and the number of channels are adjusted,
   wherein the latency is allowed to be decreased,
   wherein the target latency is a latency required for a consensus process in the blockchain network, wherein, in the step (b), the latency is a time which is required to fill a block constituting one block size, and
wherein the block size is represented by the number of transactions which are stored in the block.

2. The method according to claim 1, wherein the step (b) includes: measuring the latency for a process where one block of the blockchain network is filled with transactions and a consensus process is fulfilled,
wherein, the step (c) includes: comparing the measured latency with the target latency for a process where one block is filled in accordance with one block size and a consensus process is fulfilled, and
the step (d) includes: adjusting the block size according to the comparison result of the step (c).

3. The method according to claim 2, wherein the step (d) includes:
increasing the block size if the target latency is larger than the measured latency; and
decreasing the block size if the target latency is not larger than the measured latency.

4. The method according to claim 1, wherein the step (d) includes:
checking the number of vCPUs that can be allocated according to the measured latency; and
changing the number of channels at the same rate as the checked number of the vCPUs.

5. The method according to claim 4, wherein the step (d) includes:
increasing the number of vCPUs and the number of channels if the number of vCPUs that can be allocated is larger than the number of vCPUs that are currently allocated; and
adjusting the endorsement policy if the number of vCPUs that can be allocated is not larger than the number of vCPUs that are currently allocated.

6. The method according to claim 1, wherein the latency is determined according to the number of transactions that occur.

7. A non-transitory computer readable storage media having program instructions in a chain code that, when executed by a processor of a node in a blockchain network, cause the processor to implement the method for enhancing throughput of a blockchain network according to claim 1.

8. A blockchain network comprising a plurality of nodes, each of the plurality of nodes with processor and memory to store and execute automatically a chain code,
wherein the chain code configured to store a preset target latency, compare the target latency with a latency measured in real time, and adjust a block size so as to maintain the target latency according to the comparison result, adjust the number of vCPUs and the number of channels after determining that the target latency cannot be maintained even after the block size is adjusted, and adjust an endorsement policy after determining that the target latency cannot be maintained even after the number of vCPUs and the number of channels are adjusted,
wherein the target latency is a latency required for a consensus process in the blockchain network, and
wherein the measured latency is a latency required to fill a block constituting one block size.

9. The blockchain network according to claim 8, wherein the blockchain network is a hyper ledger blockchain network.

* * * * *